(12) United States Patent
Charlet et al.

(10) Patent No.: US 7,616,898 B2
(45) Date of Patent: Nov. 10, 2009

(54) METHOD OF OPERATING AN OPTICAL TRANSMISSION SYSTEM WITH A BIT-TO-BIT POLARIZATION INTERLEAVED BITSTREAM

(75) Inventors: Gabriel Charlet, Villiers-le-Bacle (FR); Erwan Corbel, Bourg-la-Reine (FR)

(73) Assignee: Alcatel, Paris (FR)

(*) Notice: Subject to any disclaimer, the term of this patent is extended or adjusted under 35 U.S.C. 154(b) by 454 days.

(21) Appl. No.: 11/091,532

(22) Filed: Mar. 29, 2005

(65) Prior Publication Data
US 2005/0259992 A1   Nov. 24, 2005

(30) Foreign Application Priority Data
May 19, 2004   (EP)   ................................. 04291292

(51) Int. Cl.
*H04B 10/00*   (2006.01)

(52) U.S. Cl. ...................... 398/152; 398/158; 398/159; 398/162; 398/163

(58) Field of Classification Search ................ 398/152, 398/150, 184, 65, 205, 206; 375/224
See application file for complete search history.

(56) References Cited

U.S. PATENT DOCUMENTS

| | | | | |
|---|---|---|---|---|
| 4,475,210 A * | 10/1984 | Couch | ......................... | 375/224 |
| 5,031,236 A * | 7/1991 | Hodgkinson et al. | ......... | 398/152 |
| 5,111,322 A * | 5/1992 | Bergano et al. | ............... | 398/74 |
| 5,841,557 A | 11/1998 | Terahara et al. | | |
| 5,880,837 A * | 3/1999 | Roberts | ........................ | 356/450 |
| 5,986,784 A * | 11/1999 | Kersey et al. | ................ | 398/152 |
| 6,559,991 B1 * | 5/2003 | Farley et al. | ................. | 398/152 |
| 6,950,611 B2 * | 9/2005 | Erdogan et al. | ............. | 398/152 |
| 7,035,538 B2 * | 4/2006 | Willner et al. | ................ | 398/29 |
| 7,103,279 B1 * | 9/2006 | Koh et al. | ..................... | 398/115 |
| 2002/0154373 A1 * | 10/2002 | Akashi | ........................ | 359/189 |
| 2002/0181040 A1 | 12/2002 | Lach | | |
| 2003/0131031 A1 * | 7/2003 | Klass | ........................... | 708/250 |
| 2005/0254749 A1 * | 11/2005 | Bulow | ........................... | 385/27 |

FOREIGN PATENT DOCUMENTS

| | | |
|---|---|---|
| EP | 0 277 427 A | 8/1988 |
| EP | 0 507 508 A | 10/1992 |

* cited by examiner

*Primary Examiner*—Ken N Vanderpuye
*Assistant Examiner*—Hibret A Woldekidan
(74) *Attorney, Agent, or Firm*—Sughrue Mion, PLLC

(57) ABSTRACT

A method of operating an optical transmission system is described. The transmission system is provided with a bit-to-bit polarization interleaved bitstream having a given bitrate. The transmission system comprises a birefringent element and/or a decision circuit. The birefringent element and/or the decision circuit are triggered by a trigger signal having a frequency of half of the bitrate.

13 Claims, 2 Drawing Sheets

METHOD OF OPERATING AN OPTICAL TRANSMISSION SYSTEM WITH A BIT-TO-BIT POLARIZATION INTERLEAVED BITSTREAM

TECHNICAL FIELD

The invention relates to a method of operating an optical transmission system with a bit-to-bit polarization interleaved bitstream having a given bitrate wherein the optical transmission system comprises a birefringent element and/or a decision circuit. The invention also relates to corresponding optical transmission systems and to corresponding receiving systems for optical transmission systems. The invention is based on a priority application EP 04 291 292.3 which is hereby incorporated by reference.

BACKGROUND OF THE INVENTION

It is known to use a bit-to-bit polarization interleaved bitstream to reduce e.g. non-linear effects during transmission. It is also known to compensate the so-called polarization mode dispersion with the help of birefringent elements. However, this compensation requires an eye monitor which does not cope well with the mentioned bit-to-bit polarization interleaved bitstream. The same is valid for the decision circuit of known optical transmission systems.

SUMMARY OF THE INVENTION

It is therefore an object of the invention to provide a method of operating an optical transmission system with a bit-to-bit polarization interleaved bitstream which overcomes the problems posed by polarization mode dispersion.

This object is solved by a method of operating an optical transmission system with a bit-to-bit polarization interleaved bitstream having a given bitrate wherein the optical transmission system comprises a birefringent element and/or a decision circuit wherein the birefringent element and/or the decision circuit are triggered by a trigger signal having a frequency of half of the bitrate. The object is also solved by an optical transmission system with a bit-to-bit polarization interleaved bitstream having a given bitrate comprising a birefringent element and an eye monitor for influencing the birefringent element wherein the eye monitor is triggered by a trigger signal having a frequency of half of the bitrate or with a bit-to-bit polarization interleaved bitstream having a given bitrate comprising a light sensitive element wherein the output signal of the light sensitive element is provided to two decision circuits which are triggered by a trigger signal having a frequency of half of the bitrate and by a receiving system for an optical transmission system with a bit-to-bit polarization interleaved bitstream having a given bitrate comprising a birefringent element and an eye monitor for influencing the birefringent element wherein the eye monitor is triggered by a trigger signal having a frequency of half of the bitrate or with a bit-to-bit polarization interleaved bitstream having a given bitrate comprising a light sensitive element wherein the output signal of the light sensitive element is provided to two decision circuits which are triggered by a trigger signal having a frequency of half of the bitrate.

According to the invention, the birefringent element and/or the decision circuit are triggered by a trigger signal having a frequency of half of the bitrate.

According to the invention, only every second bit of the bitstream is used by the birefringent element and/or the decision circuit. This has the consequence that always only those bits are used by the birefringent element and/or the decision circuit which correspond to the same polarization. The different impacts of the so-called polarization dependent losses on subsequent bits of the bitstream, therefore, do not influence the the birefringent element and/or the decision circuit. The mentioned polarization mode dispersion, therefore, may be compensated with the mentioned eye monitor without any further problems.

BRIEF DESCRIPTION OF THE DRAWINGS

Further features, applications and advantages of the invention will become apparent from the following description of exemplary embodiments of the invention which are shown in the figures of the drawing. There, all described and shown features themselves or in any combination represent the subject matter of the invention, independently of their wording in the description or their representation in the drawings and independently of their combination in the claims or the dependicies of the claims.

DETAILED DESCRIPTION OF PREFERRED EMBODIMENTS

Figure 1:
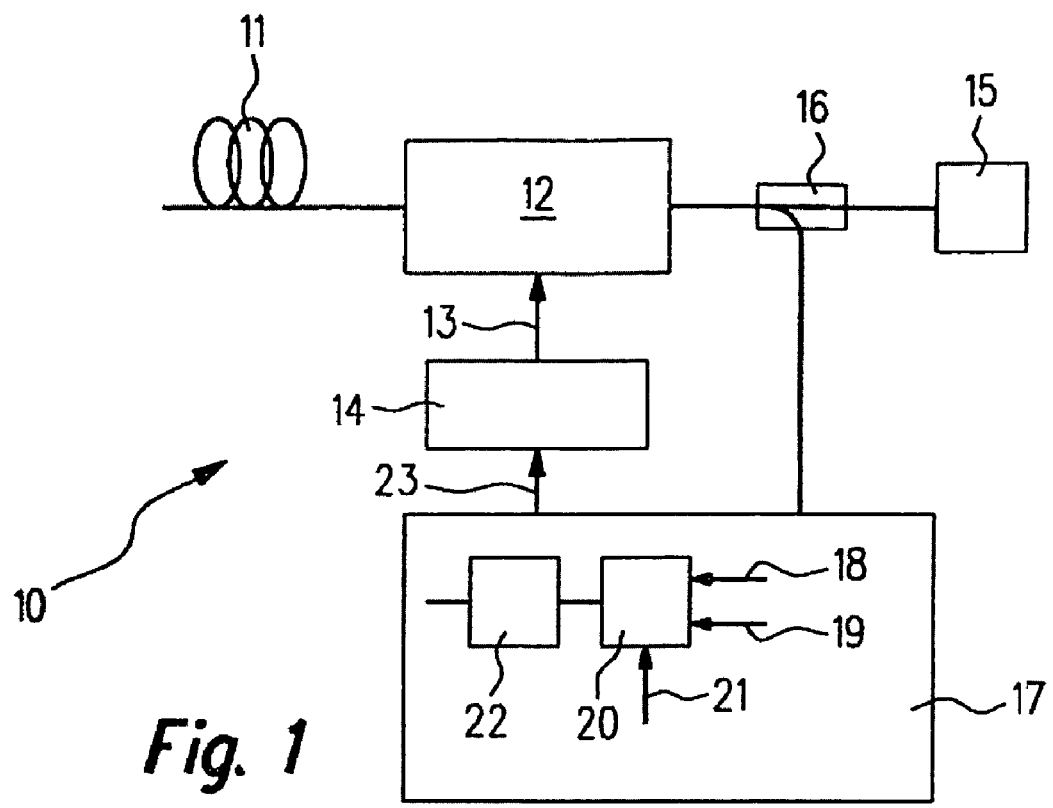
FIG. 1 shows a schematic block diagram of an embodiment of an optical transmission system with a bit-to-bit polarization interleaved bitstream according to the invention.

FIG. 1 shows an optical transmission system 10 comprising a fibre 11. A bitstream is transmitted in the fibre 11 in a bit-to-bit polarization interleaving format. This format has a property that subsequent bits of the bitstream have orthogonal polarizations.

The bitstream on the fibre 11 has a bitrate BR, for example 40 Gbit/s.

The fibre 11 is coupled to a receiving system comprising optical birefringent elements 12. These birefringent elements 12 are controlled by an electrical signal 13 produced by a calculating circuit 14. The birefringent elements 12 are provided to compensate the polarization properties of the subsequent bits of the bitstream in dependence on the electrical signal 13.

From the output of the birefringent elements 12, the bitstream is forwarded to a receiver 15 for further processing and in particular for detection. A beam splitter 16 is provided at the output of the birefringent elements 12 for forwarding a part of the intensity of the bitstream, for example 1 percent of the intensity of the bitstream, to an eye monitor 17.

In the eye monitor 17, an electrical signal 18 is present which corresponds to the optical bitstream received by the eye monitor 17, and which may be generated for example by a photodiode. Furthermore, a variable threshold value 19 is present which is permanently increased and decreased between a maximum and a minimum value. The eye monitor 17 comprises a decision flip-flop 20 which receives the electrical signal 18 and the threshold value 19. Furthermore, the decision flip-flop 20 receives a trigger signal 21 with a fixed frequency which triggers the generation of an output signal of the decision flip-flop 20.

Triggered by the trigger signal 21, the decision flip-flop 20 compares the actually received signal 18 and the variable threshold value 19. Depending on whether the signal 18 is greater or smaller than the threshold value 19, the decision flip-flop 20 generates a binary value "1" or a binary value "0" at its output.

The output of the decision flip-flop 20 is connected to an integrator 22 which integrates the received binary values over the time. Based on this integration, a resulting output signal 23 of the eye monitor 17 is provided which represents a quality criteria of the optical bitstream which is received by the eye monitor 17. As the bitstream received by the eye monitor 17 was split from the optical bitstream forwarded to the receiver 15, the output signal 23 also represents a quality criteria of the optical bitstream forwarded to the receiver 15.

The output signal 23 is forwarded to the calculation circuit 14 and is used to generate the electrical signal 13 influencing the birefringent elements 12. The generation of the electrical signal 13 is carried out by the calculation circuit 14 according to given algorithms with the goal to increase the quality of the optical bitstream forwarded to the receiver 15.

As described, the bitstream on the fibre 11 is transmitted in a bit-to-bit polarization interleaving format with orthogonal polarizations of subsequent bits. Due to these orthogonal polarizations, so-called polarization dependent losses of the fibre 11 have different impacts on subsequent bits. In particular, the attenuation of subsequent bits is different along the fibre 11 wherein the attenuation of every second bits are about the same.

Figure 2:
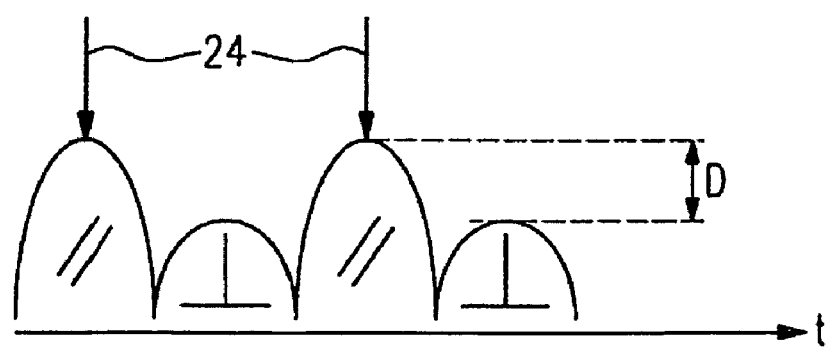
FIG. 2 shows a schematic diagram of subsequent bits of a bitstream being transmitted over an optical tranmission system.

This effect is shown in FIG. 2 which depicts four subsequent bits over the time t. The first and the third bit have a parallel polarization and the second and the fourth bit have an orthogonal polarization thereto. Due to the polarization dependent losses along the fibre 11, the first and the third bit have a higher intensity as the second and the fourth bit wherein the intensities of the first and the third bit are almost the same and the intensities of the second and the fourth bit are also almost the same. The difference D between the intensities of the first and the third bit compared to the intensities of the second and the fourth bit is based on the different attenuations of these bits due to their orthogonal polarizations.

According to the invention, the frequency of the trigger signal 21 corresponds to a half of the bitrate BR of the bitstream on the fibre 11. The frequency of the trigger signal 21, therefore, is BR/2. As a result, only every second bit of the bitstream is used within the eye monitor 17. This is shown by the arrows 24 in FIG. 2.

The afore-mentioned value BR/2 of the frequency of the trigger signal 21 has the consequence that always only those pulses of the electrical signal 18 are used within the eye monitor 17 which correspond to bits of the same polarization. The different impacts of the described polarization dependent losses on subsequent bits of the bitstream, therefore, do not influence the output signal 23 of the eye monitor 17. This is also apparent from the arrows 24 of FIG. 2. The quality criteria provided by the output signal 23, therefore, is independent of the described polarization dependent losses along the fibre 11.

The optical transmission system 10 of FIG. 1, therefore, is suitable to compensate the so-called polarization mode dispersion which also influences the bits of the bitstream being transmitted along the fibre 11. Any decrease of the quality of the bitstream which results from such polarization mode dispersion, is detected by the eye monitor 17 and is then compensated with the help of the calculation circuit 14 and the birefringent elements 12.

The transmission system 10 of FIG. 1, therefore, is suitable to compensate polarization mode dispersion in connection with a bitstream being transmitted in a fibre in a bit-to-bit polarization interleaving format.

Figure 3:
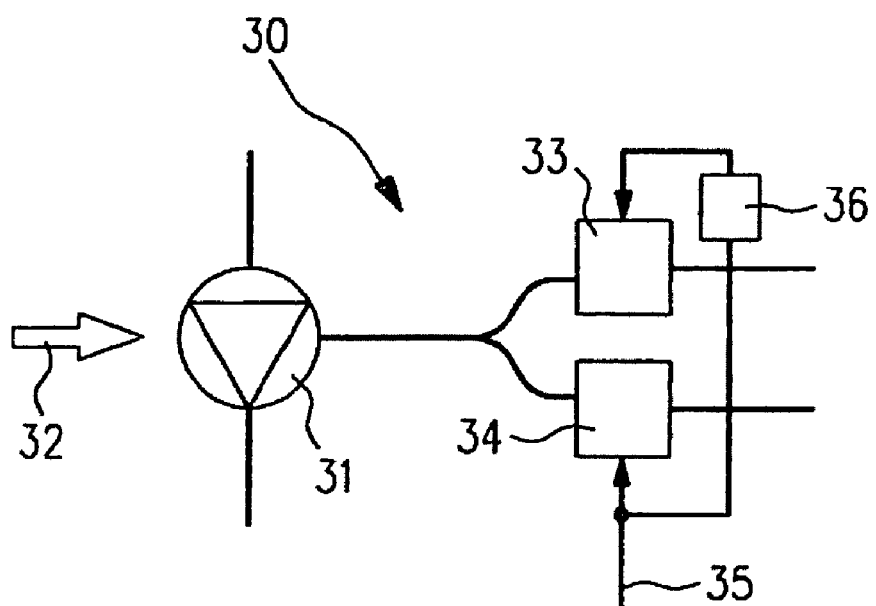
FIG. 3 shows a schematic block diagram of an embodiment of a receiving system for receiving a bit-to-bit polarization interleaved bitstream within an optical transmission system according to the invention.

FIG. 3 shows a receiving system 30 for receiving a bit-to-bit polarization interleaved bitstream of an optical transmission system. The recieving system 30 may be used as the receiver 15 of the optical transmission system 10 of FIG. 1. However, the receiving system 30 may also be used independently of FIG. 1 in another optical transmission system.

The receiving system 30 comprises an electrical light sensitive element 31, for example a photodiode, which is suitable to detect light being transmitted for example over a fibre of the transmission system. This function of the light sensitive element 31 is illustrated in FIG. 3 by the arrow 32.

The bitstream being received by the light sensitive elements 31 has a bitrate BR, for example 40 Gbit/s.

The light sensitive element 31 generates an electrical signal which is forwarded to two decision circuits 33, 34. Each one of these decision circuits 33, 34 is triggered by a common trigger signal 35 which has a fixed frequency. However, the trigger signals 35 for the two decision circuits 33, 34 are provided with a phase shift of a half period of the trigger signal 35. This phase shift is illustrated by a block 36 in FIG. 3.

As described, the bitstream received by the light sensitive element 31 is transmitted in a bit-to-bit polarization interleaving format with orthogonal polarizations of subsequent bits. Due to these orthogonal polarizations, so-called polarization dependent losses arise during transmission via a fibre which have different impacts on subsequent bits. In particular, the attenuation of subsequent bits is different wherein the attenuation of every second bits are about the same.

This effect is shown in FIG. 2 which depicts four subsequent bits over the time t. The first and the third bit have a parallel polarization and the second and the fourth bit have an orthogonal polarization thereto. Due to the polarization dependent losses during transmission along a fibre, the first and the third bit have a higher intensity as the second and the fourth bit wherein the intensities of the first and the third bit are almost the same and the intensities of the second and the fourth bit are also almost the same. The difference D between the intensities of the first and the third bit compared to the intensities of the second and the fourth bit is based on the different attenuations of these bits due to their orthogonal polarizations.

According to the invention, the frequency of the trigger signal 35 corresponds to a half of the bitrate BR of the bitstream being received by the light sensitive element 31. The frequency of the trigger signal 35, therefore, has a value of BR/2.

The afore-mentioned value BR/2 of the frequency of the trigger signal 35 has the consequence that only bits of the same polarization are used within each one of the two decision circuits 33, 34. The different impacts of the described polarization dependent losses on subsequent bits of the bitstream, therefore, do not influence the decisions generated by the two decision circuits 33, 34.

This is also apparent from the arrows 24 of FIG. 2. Due to the value BR/2 of the frequency of the trigger signal 35, the bits characterized by these arrows 24 are processed by one and the same decision circuit, for example by decision circuit 33. As a consequence, the decisions generated by this decision circuit 33 are independent of the described polarization dependent losses. The same is valid for the other bits shown in FIG. 2. Due to the mentioned phase shift 36, these bits are processed by the other one of the two decision circuits, i.e. by decision circuit 34. As a consequence, the decisions generated by this decision circuit 34 are also independent of the described polarization dependent losses.

The receiving system 30 of FIG. 3, therefore, is suitable to generate decisions in connection with a bitstream being transmitted in a fibre in a bit-to-bit polarization interleaving format wherein these decisions are independent of polarization dependent losses on the fibre.

Figure 4:
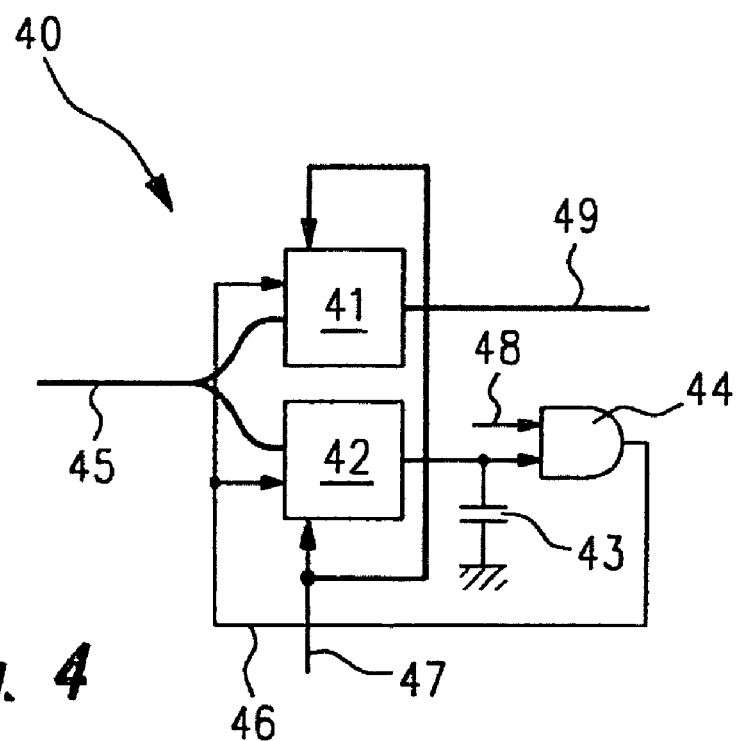
FIG. 4 shows a schematic block diagram of an embodiment of a decision circuit e.g. for the receiving system of FIG. 3.

FIG. 4 shows a decision circuit 40 for a receiving system. The decision circuit 40 may be used as the decision circuit 33 or the decision circuit 34 of FIG. 3. However, the decision circuit 40 of FIG. 4 may also be used independently of FIG. 3.

The decision circuit 40 of FIG. 4 comprises two decision flip-flops 41, 42, a grounded capacitor 43 and a comparator 44. An input signal 45 is provided to the decision circuit 40. Each one of the two decision flip-flops 41, 42 receives the input signal 45 as well as a threshold value 46. Furthermore, each one of the two decision flip-flops 41, 42 receives a trigger signal 47 with a fixed frequency and without a phase shift between the two flip-flops 41, 42.

An output signal of the second decision flip-flop 42 is connected to the capacitor 43 and to the comparator 44. A reference value 48 is also forwarded to the comparator 44. The reference value 48 is an analogue value that corresponds to an equal number of binary values "1" and "0". The threshold value 46 is provided as the output of the comparator 44. The output of the first decision flip-flop 44 constitutes the output signal 49 of the decision circuit 40.

The first decision flip-flop 41 is provided to carry out the decision whether the received input signal 45 has the binary value "1" or the binary value "0". The second decision flip-flop 42 is provided for controlling the threshold value 46 in order to increase the quality of the decision carried out by the first decision flip-flop 41.

The output signal of the second decision flip-flop 42 is integrated over a huge number of bits by the capacitor 43 and then compared with the reference value 48. It is assumed that the bits received by the light sensitive element 31 have an equal number of the binary value "1" and of the binary value "0" over the time. If all decisions made by the second decision flip-flop 42 would be correct, then the integrated output signal of the second decision flip-flop 42 would be equal to the reference value 48. As a result, the threshold value 46 would remain unchanged.

However, e.g. due to polarization dependent losses on the fibre, the bits received by the light sensitive element 31 will change over the time. This will lead to incorrect decisions made by the second decision flip-flop 42. As a consequence, the integrated output signal of the second decision flip-flop 42 will deviate from the value 0, 5 and therefore from the reference value 48. The comparator 44 will then influence the threshold value 46 in such a manner that the described deviation is minimized. This represents the mentioned control of the threshold value 46 by the comparator 44 which has the result that the decision circuit 40 is independent of changes of the bits along the fibre.

The controlled threshold value 46 is compared with the received input signal 45 by both decision flip-flops 41, 42. Therefore, the decision of the first decision flip-flop 41, i.e. the decision whether the received input signal 45 has the binary value "1" or the binary value "0", is always carried out on the basis of the controlled threshold value 46. The output signal 49 is therefore independent of changes of the bits along the fibre e.g. due to polarization dependent losses. Thereby, the bit error rate of the received bits is decreased.

The invention claimed is:

1. A method of operating an optical transmission system with a bit-to-bit polarization interleaved bitstream having a given bitrate, the method comprising:
    transmitting the bitstream through a fiber to a birefringent element;
    transmitting an output of the birefringent element having a bitrate equal to the given bitrate to a decision circuit;
    transmitting a trigger signal having a frequency of half of the given bitrate to the decision circuit; and
    controlling the birefringent element using an output of the decision circuit to compensate polarization properties of the bitstream;
    wherein the optical transmission system comprises the birefringent element and the decision circuit, and
    wherein the decision circuit is triggered by the trigger signal.

2. An optical transmission system with a bit-to-bit polarization interleaved bitstream having a given bitrate comprising:
    a birefringent element which compensates polarization properties of the bitstream; and
    an eye monitor which receives an output of the birefringent element having a bitrate equal to the given bitrate and which influences the birefringent element to compensate polarization properties of the bitstream,
    wherein the eye monitor receives a trigger signal that triggers the eye monitor, the trigger signal having a frequency of half of the given bitrate.

3. The transmission system of claim 2 wherein the eye monitor receives a part of the bitstream which is forwarded from the birefringent element to a receiver.

4. The transmission system of claim 3 wherein eye monitor comprises a comparator and that the bitstream received by the eye monitor is compared by the comparator with a threshold value which is permanently increased and decreased between a maximum and a minimum value.

5. The transmission system of claim 4 wherein the comparator is triggered by the trigger signal.

6. The transmission system of claim 4 wherein the output signal of the comparator is integrated over the time.

7. The transmission system of claim 3 wherein the eye monitor generates an electrical signal corresponding to the received part of the bitstream.

8. The transmission system of claim 2 wherein the trigger signal triggers the generation of an output signal from a decision flip-flop.

9. A receiving system for an optical transmission system with a bit-to-bit polarization interleaved bitstream having a given bitrate comprising:
    a birefringent element which compensates polarization properties of the bitstream; and
    an eye monitor which receives an output of the birefringent element having a bitrate equal to the given bitrate and which influences the birefringent element to compensate polarization properties of the bitstream,
    wherein the eye monitor receives a trigger signal that triggers the eye monitor, the trigger signal having a frequency of half of the given bitrate.

10. The receiving system of claim 9 wherein the eye monitor receives a part of the bitstream which is forwarded from the birefringent element to a receiver.

11. The receiving system of claim 10 wherein eye monitor comprises a comparator and that the bitstream received by the eye monitor is compared by the comparator with a threshold value which is permanently increased and decreased between a maximum and a minimum value.

12. The receiving system of claim 11 wherein the comparator is triggered by the trigger signal.

13. The receiving system of claim 11 wherein the output signal of the comparator is integrated over the time.

* * * * *

UNITED STATES PATENT AND TRADEMARK OFFICE
CERTIFICATE OF CORRECTION

PATENT NO. : 7,616,898 B2  Page 1 of 1
APPLICATION NO. : 11/091532
DATED : November 10, 2009
INVENTOR(S) : Charlet et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 646 days.

Signed and Sealed this

Nineteenth Day of October, 2010

David J. Kappos
*Director of the United States Patent and Trademark Office*